(12) United States Patent
Kadrnoska et al.

(10) Patent No.: US 8,385,392 B2
(45) Date of Patent: Feb. 26, 2013

(54) NETWORK AND METHOD FOR TRANSMITTING DATA IN A SYSTEM OF PIPES

(75) Inventors: Helmut Kadrnoska, Vienna (AT); Gerhard Reiss, Laxenburg (AT)

(73) Assignee: Cablerunner Austria GmbH & Co. KG, Vienna (AT)

( * ) Notice: Subject to any disclaimer, the term of this patent is extended or adjusted under 35 U.S.C. 154(b) by 588 days.

(21) Appl. No.: 12/666,912

(22) PCT Filed: Jun. 25, 2008

(86) PCT No.: PCT/AT2008/002229
§ 371 (c)(1),
(2), (4) Date: Jan. 26, 2010

(87) PCT Pub. No.: WO2009/000004
PCT Pub. Date: Dec. 31, 2008

(65) Prior Publication Data
US 2010/0183058 A1    Jul. 22, 2010

(30) Foreign Application Priority Data
Jun. 25, 2007    (AT) .................................. A 986/2007

(51) Int. Cl.
*H04B 3/46*    (2006.01)
(52) U.S. Cl. ........ 375/220; 375/257; 375/295; 375/316; 375/258; 375/219
(58) Field of Classification Search .................. 375/257, 375/295, 316, 258, 219, 220
See application file for complete search history.

(56) References Cited

U.S. PATENT DOCUMENTS 6,155,292 A * 12/2000 Kurata .......................... 137/552
(Continued)

FOREIGN PATENT DOCUMENTS

| DE | 19701787 A1 | 7/1998 |
| WO | 0006843 A1 | 2/2000 |

(Continued)

OTHER PUBLICATIONS

Pipenet: A Wireless Sensor Network for Pipeline Monitoring, Author(s): Stoianov, I. Imperial Coll. London, London, Nachman, L. ; Madden, S. ; Tokmouline, T. ; Csail, M. , Date of Conference: Apr. 25-27, 2007.*

*Primary Examiner* — Kenneth Lam
(74) *Attorney, Agent, or Firm* — Laurence A. Greenberg; Werner H. Stemer; Ralph E. Locher

(57) ABSTRACT

A network contains a main pipe, a branch pipe leading to the main pipe, an electric data line laid in the main pipe and one laid in the individual connecting pipe, one central data distribution unit and a terminal unit. A data line is introduced into the main pipe and is connected to the data distribution unit, its other end laid in the system of pipes being configured as a transmitting or receive antenna. An additional data line is introduced into the system of pipes via the individual connecting pipe and is connected to the terminal unit with one end and another end is configured as a transmitting or receive antenna. The transmitting or receive antenna of the data line serving as an antenna and the transmitting or receive antenna of the additional data line form a pair of antennas between the antennas of which a radio link exists.

31 Claims, 2 Drawing Sheets

U.S. PATENT DOCUMENTS

| | | |
|---|---|---|
| 6,305,427 B1 | 10/2001 | Priest, II |
| 6,492,898 B1 * | 12/2002 | Sabbattini et al. ......... 340/854.9 |
| 6,766,141 B1 * | 7/2004 | Briles et al. ..................... 455/40 |
| 6,845,209 B1 | 1/2005 | Hecht |
| 7,221,282 B1 * | 5/2007 | Ross et al. ..................... 340/618 |
| 8,049,506 B2 * | 11/2011 | Lazarev ......................... 324/333 |
| 8,076,928 B2 * | 12/2011 | Nunally ......................... 324/220 |
| 2001/0043839 A1 | 11/2001 | Prusak |
| 2004/0048596 A1 * | 3/2004 | Wyrzykowska et al. ...... 455/403 |
| 2004/0170476 A1 | 9/2004 | Kadrnoska et al. |
| 2005/0072465 A1 * | 4/2005 | Preul ............................... 137/79 |
| 2010/0245075 A1 * | 9/2010 | Stevens et al. ............. 340/539.1 |

FOREIGN PATENT DOCUMENTS

WO 02082610 A1 10/2002

* cited by examiner

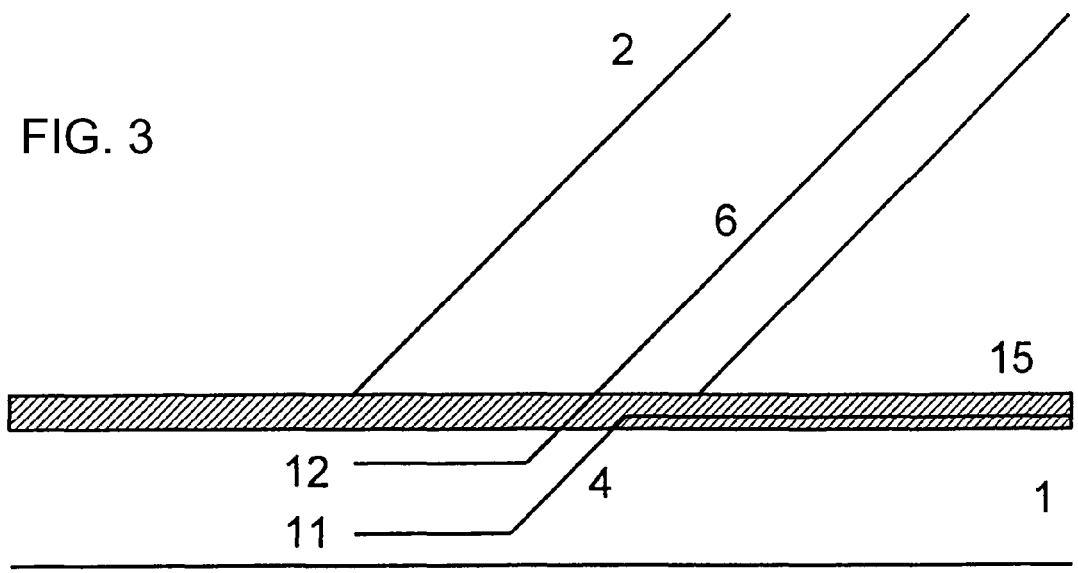

NETWORK AND METHOD FOR TRANSMITTING DATA IN A SYSTEM OF PIPES

BACKGROUND OF THE INVENTION

Field of the Invention

The invention relates to a network for data transmission according to the preamble of Claim 1, and a method for data transmission in a network according to the preamble of Claim 13.

The expansion of the data lines required for telecommunications is reaching its limits especially in urban areas, as in particular the necessary pipe systems for laying fibre optic cables can only be created at great cost. In most cases the municipal infrastructure prevents simple laying measures, so that major building work is necessary in order to dig out trenches in which the data lines are run. Although with this technology a large number of data lines can be laid in one operation and a pipe when laid can be completely filled with cables, these methods have disadvantages, such as noise and dust emission, traffic delays and the related high costs. A far better alternative is the shared use of previously existing cavity formations, such as waste and rain water sewers. This technique is managed without extensive digging work, and is furthermore economical and quick. The laying is done without affecting traffic and business.

One of the main problems arising in connection with the laying of data lines in pipe systems is that while the data lines can be laid in the pipe system without too great a cost, the possibility of branching to individual subscribers causes difficulties, and sometimes is only possible to a limited extent.

BRIEF SUMMARY OF THE INVENTION

The invention has the object of creating a network which is easily constructed, and in particular the object of solving the problem arising from the lack of branching possibilities for data lines laid in pipes.

The invention achieves the objects for a network of the kind initially mentioned according to the features of the characterizing part of Claim 1, and for a method of the kind initially mentioned with the features given in the characterizing part of Claim 13.

A network according to the invention includes a customary sewage or channel pipe system, which includes a main pipe and at least one individual outlet flowing into the main pipe, fed for example from the sanitary facilities of a building or dwelling to the main sewer. Such a constellation of drains is usual in domestic sewage systems. Furthermore, a data line is put or laid in the main pipe, either directly into the main pipe or via an individual outlet flowing into the main pipe or a service shaft connected to the main pipe, this data line being connected to a central data distribution unit, preferably a server. This central data distribution unit can be connected to a data network, in particular the Internet. Provided for each individual outlet that is to be supplied with data or communicated with are a separate data line, which is connected to the central data distribution unit and runs in the main pipe up to the confluence point of the corresponding individual outlet, and a further data line, which runs in the individual outlet, coming from a house or dwelling for example, up to the main pipe. The building end of the further data line which is laid in the individual outlet is connected to a terminal device, e.g. a data processing unit, in particular a computer, or to a further data distribution unit, in particular WLAN.

The essential advantage of the device according to the invention and/or the method according to the invention is that the corresponding data lines in the pipe system do not have to be directly connected: their ends simply have to be put in a certain proximity, or brought close to each other. This considerably simplifies the laying, without reducing the transmission quality.

At the end of the data line that runs from the central data distribution unit to the confluence of the individual outlet into the main pipe, and at the end of the further data line that runs in the individual outlet, both of these ends being in the main pipe, either transceiver antennas are provided or the ends of the data lines are developed as transceiver antennas. As a result of this, the laying of the data lines in the pipe system is not further complicated by the need to create a connection or a branch in the confluence area of junction pipes.

According to Claim 2, with the antenna pair disposed in the vicinity of the confluence of the individual outlet into the main pipe, data is transmitted between the two antennas in this area, which has the advantage that the path that has to be bridged by means of a radio link remains small, and losses are minimized. In practice it is advantageous if the antenna pair is disposed no further away than one pipe diameter of the individual outlet from the confluence of the individual outlet into the main pipe.

According to Claim 3, for the data transmission it is advantageous and economical to remove the shielding at the end of the data line or the further data line over a certain area, and to position the, in particular single, inner conductor, in particular stripped, in the area of or before the confluence of the individual outlet into the main pipe. According to Claim 4, coaxial cables with an inner conductor are especially suitable for this Between the two antennas a radio link is developed, over which the data can be simply and securely transmitted, without giving rise to the problem of laying and connecting the data line in the confluence area of the individual outlet.

According to Claim 5 it is advantageous that, for transmission on a specific frequency, the same dimensions and/or the same form are provided for the transceiver antennas.

According to Claims 6 and 14 it is advantageous for the data transmission if the antennas of the antenna pairs are aligned parallel, by which means the channel attenuation is reduced, the received power is increased and higher data throughput rates are enabled.

A further problem that occurs when two individual outlets are close to each other, namely that the respective transmitting and receiving areas overlap, is solved according to the invention with the features of Claims 7 and 15.

In order to increase the data throughput between the central data distribution unit and the terminal device provided at an individual outlet, the features of Claims 8 and 16 can be provided. To prevent overlapping of the transmitting and receiving areas of the individual antennas, a separate frequency or a separate protocol can be provided in the area of the confluence of the individual outlet for the communication of each antenna pair.

The features of Claims 9 and 10 serve to prevent the occurrence of blocking in the main pipe or kinking of the data lines within the pipe system as a result of a large number of data lines. This cable conduit can be equipped with openings, so that individual data lines can be led out from the cable conduit at the required point before an individual outlet. The cable conduit is usually attached in the top area of the cross section of the main pipe, with the advantage that disturbance to the flow of the waste water is kept to a minimum.

Claim 11 offers the advantage that the positioning of the ends of the data lines is simplified.

According to Claim 12, if the data processing unit which is connected on the building side end area of an individual outlet is a distribution unit for cable-free data transmission, in particular a router for WLAN, the advantage ensues that those rooms of a building which are fitted with a waste water connection or have an individual outlet, and can usually only be connected to data processing units with difficulty or at great expense, can now easily be equipped with communication devices. Even in the case in which outgoing individual outlets in the form of sanitation units with waste water or sewage pipes are immediately next to the premises containing data processing units, it is advantageous to bridge the distance between the sanitation unit and the data processing unit by radio. This is not a problem inasmuch as electrical power is normally available in sanitary facilities.

According to Claim 13, at least one data line, and advantageously for each individual outlet a separate data line, which is connected to a central data distribution unit, is put into the main pipe. The distant end of the respective data line from the central data distribution unit is either developed as a transceiver antenna or equipped with a transceiver antenna. From the building end of an individual outlet, a further data line is furthermore brought via this individual outlet into the sewage or pipe system, in particular up to or into the main pipe. One advantage over conventional methods is that no end-to-end data line need be laid, so that in addition to the considerable cost necessary for introducing the data line, kinking and a consequent pipe blockage can also be avoided. It is only necessary to put data lines or cable into the main pipe or into the individual outlet. When laying the data lines, it should be ensured in order to achieve an appropriate transmission quality that the antennas which are in the end area of the data line and the further data line are aligned parallel or at least approximately parallel, or have a corresponding reciprocal distance. It is possible to fix the ends of the data lines 4 and 6 or the antennas of the antenna pair into the main pipe, e.g. to screw them to the channel wall with a pipelining robot.

If, as provided in Claim 17, the data lines are put into position in the pipes by means of a remote-controlled robot, small-diameter pipes which are inaccessible to people can also be used for accommodating data lines.

In accordance with Claims 11 and 19, the data line can be freely laid or positioned at any points in the confluence area, as a result of which the transmission quality can be optimized and the transmitting/receiving rates can be raised.

The length of the data line or further data line should be sized such that the ends of the data line are disposed in a position in which they interact optimally, or in which a maximum data transmission rate or minimum channel attenuation is produced. In principle, care is taken that the ends of the two data lines are as close together as possible.

A simple implementation of the data lines is achieved according to Claim 20, the advantage being achieved that the data lines can be brought into position automatically by pulling.

BRIEF DESCRIPTION OF THE SEVERAL VIEWS OF THE DRAWING

FIG. 3 shows the confluence area of an individual outlet or junction pipe into a main pipe.

DESCRIPTION OF THE INVENTION

Figure 1:
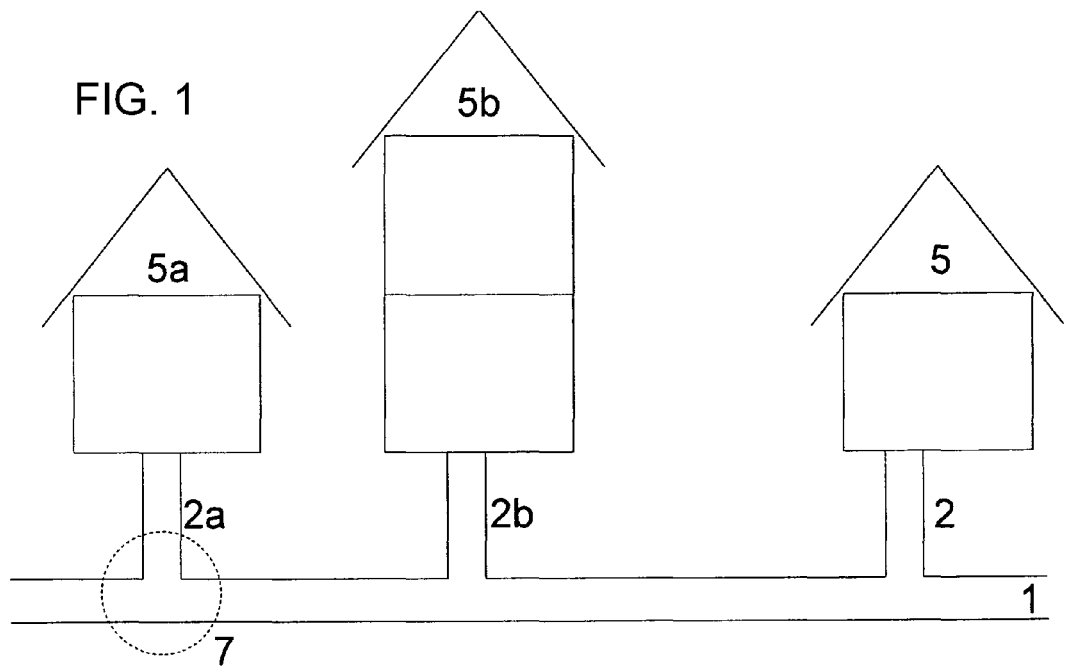
FIG. 1 shows the pipework usually present for a building's sewage system.

FIG. 1 shows a plurality of buildings 5a, 5b, each of which is equipped with an individual outlet 2a, 2b of a sewer line system. The individual outlets 2a and 2b flow into a main pipe 1. Via the individual outlet 2, a further building 5 is connected to the main pipe 1.

Figure 2:
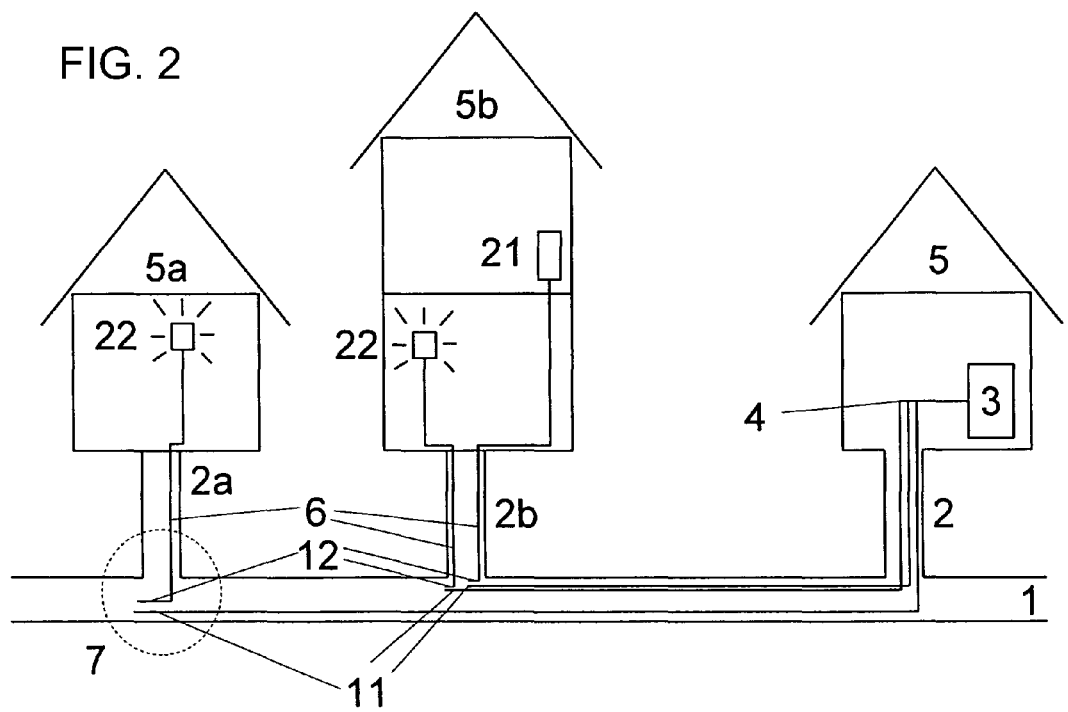
FIG. 2 shows a schematic overall representation of a network according to the invention for the transmission of data, with data lines put in the pipework that is shown in FIG. 1.

FIG. 2 shows the network according to the invention, including the drain system and the cabling for the data transmission, in particular the data lines 4 and 6 laid in the main pipe 1 and in the individual outlets 2a, 2b. FIG. 2 shows three electrical data lines 4 laid in the main pipe 1 and a central data distribution unit 3 installed in building 5. It is provided that at least one data line 4 is installed in the main pipe and connected by one end to the data distribution unit 3. Its other end is developed as transceiver antenna 11, or has a fitted transceiver antenna 11. Further data lines 6 are put into the main pipe 1 from the individual outlets 2a, 2b. These are connected at one of their ends to a terminal device 21 located in the respective building 2a, 2b. The further data lines 6 leading away from here are put in the individual outlets 2a and the respective other end of the further data line 6 is developed as a transceiver antenna 12, or is equipped with a transceiver antenna 12, and is in the area 7 of the confluence of the individual outlet 2 into the main pipe 1. The transceiver antenna 11 provided at the end of the data line 4 or the data line end 4 acting as antenna 12, and the transceiver antenna at the end of the further data line 6 or the further data line end 6 which acts as antenna 12, form an antenna pair, a radio link being set up or developed between these antennas 11, 12. The data to be transferred is fed from the data distribution unit 3 or the terminal devices 21 into the data line 6 and into the further data lines (4), or received via these.

Instead of a terminal device 21 or in addition to this, a further distribution unit 22 can be provided, which wirelessly further distributes in its vicinity the data that arrives via the central data distribution unit 3 at the individual outlet; this data can be received by further devices in the vicinity, or sent to the further distribution units.

The central data distribution unit 3 is located in building 5, is connected to all data lines 4 and controls the communication.

The data lines 4 going away from the data distribution unit 3 run in the main pipe 1 in the direction of the area 7 of the confluences of the individual outlets 2a, 2b coming from the buildings 5a, 5b. According to FIG. 2, two data lines 4 are provided for supplying building 5b; the length of the inserted section of the respective data line 4 should be sized in such a way, and this data line should be inserted so far into the main pipe 1, that the end which is distant from the central data distribution unit 3 is positioned in the area of the confluence 7 of the individual outlet 2a.

One end of the further data line 4, which goes away from the data distribution unit 3, is analogously in the confluence area 7 of the individual outlet 2a. From the buildings 5a and 5b, respectively one and two further data lines 6 are put in the individual outlets 2a, 2b, and positioned such that they are located in the area 7 of the confluence of the respective individual outlet 2a, 2b into the main pipe 1. The data lines 4 and 6 are laid or inserted e.g. with pipelining robots, by water jet or injection or other known methods.

For guiding the data lines 4 which go away from the central data distribution unit, a cable conduit 15 can be provided. Such a cable conduit 15 is usually put in the main pipe 1 via the service shaft 2 of the building 5 with the central data distribution unit 3, before the laying of the data lines 4. Depending on the size or diameter of the main pipe 1 and of the individual outlet 2, which is preferably developed as a shaft, the laying of the cable conduit is done either by hand, or with remote-controlled robots in the case of small pipe diameters. The cable conduit 15 is usually screwed in the top end area of the pipe 1 or shaft, as this causes the least obstruction to the flow of the waste water.

It is advantageous if laying is such that the length of the data line 4 put in the pipe system and the length of the further data line 6, starting from a fixed reference point preferably outside the pipe system, is varied, and the laying position of the data lines 4, 6 is then fixed or rated as appropriate if a further insertion or pulling out of the data line 4 and/or the further data line 6 results in a deterioration of the data transmission rate and/or an increase in the channel attenuation.

The attaching of the cable conduit 15 to the main pipe 1, if necessary also in an individual outlet 2, is advantageously executed with screws and pegs, which ensure the hold of the cable conduit 15 in the upper area of the main pipe 1.

For the design of the antennas 11, 12, two different possibilities arise according to the invention. The first economical option is that the data line 4 and the further data line 6 are developed as a coaxial cable, which consists of an inner conductor and the shielding, and over a section which corresponds to a typical antenna length for the given radio frequency the shielding is removed from the cable, so that the inner conductor comes into position unshielded, preferably insulated, in the area 7 of the confluence of the individual outlet 2 into the main pipe 1. As a further option, it can be provided that an antenna of appropriate dimensions is connected at the end of the data line 4.

It is expedient if the two antennas 11, 12 of each antenna pair have the same form and the same dimensions, and are aligned parallel.

For the communication in the case of several antenna pairs with antennas 11, 12, where the ranges of influence of the respective antenna pairs are overlapping, it can be provided that different frequencies and/or protocols are used for different antenna pairs for the data transmission. To increase the data transmission rate, it can be provided that there are several antenna pairs in the confluence area 7 of an individual outlet 2b, and different frequencies and protocols are provided for the communication of the individual antenna pairs.

FIG. 3 represents the immediate area 7 of the confluence of an individual outlet 2 into the main pipe 1. The data line 4 connected to the central data distribution unit 3 is led out from the cable conduit 15 in the immediate area 7 of the confluence, and is developed at this free end as antenna 11, in particular stripped. The further data cable 6, which is run via the individual outlet 2 of the building 5, is also developed at its far end from the building as antenna 12, in particular stripped.

Instead of a sewage pipe system it is naturally possible to use other pipe systems in the area of buildings 5, said pipe systems being equipped with individual outlets 2 and with a common pipe 1. In particular, air-conditioning systems have a pipe system with a main air-conducting pipe and branching service pipes or air-conducting junction pipes, and this pipe system can be utilized similarly to a sewage pipe system for the laying of data lines 4, 6.

The data distribution unit 3 and the terminal devices 21 have the appropriate electrical and/or electronic equipment and function to be able to feed data correspondingly into the data lines and send it to the antennas, and correspondingly receive and evaluate radio signals reaching the antennas.

The invention claimed is:

1. A network for data transmission, comprising:
 a pipe system having a main pipe, at least one junction pipe flowing into said main pipe and functioning as an individual outlet, at least one electrical data line laid in said main pipe and at least one electrical data line laid in said individual outlet;
 at least one central data distribution unit;
 at least one terminal device;
 said at least one electrical data line in said main pipe having a first end connected to said central data distribution unit disposed outside said pipe system, and a second end laid in said pipe system being developed as one of a transceiver antenna and having said transceiver antenna;
 at least one further data line disposed in said pipe system via said individual outlet and having a first end connected to said terminal device disposed outside said pipe system, and a second end developed as one of a further transceiver antenna and having said further transceiver antenna; and
 one of said transceiver antenna and said second end of said electrical data line functioning as said transceiver antenna, and one of said further transceiver antenna and said second end of said further data line functioning as said further transceiver antenna, form an antenna pair, between said transceiver antennas being said transceiver antenna and said further transceiver antenna one of a radio link exists and is developed.

2. The network according to claim 1, wherein one of said transceiver antenna, said further transceiver antenna, said second end functioning as said transceiver antenna, and said second end functioning as said further transceiver antenna of said antenna pair are disposed in one of an area of confluence of said individual outlet into said main pipe and an area before said confluence of said individual outlet into said main pipe.

3. The network according to claim 1, wherein at least one of said electrical data line and said further data line has a shielding, at least one of said electrical data line and said further data line having at least one conductor projecting unshielded from said shielding of said second end.

4. The network according to claim 1, wherein at least one of said electrical data line and said further data line are formed as a coaxial cable.

5. The network according to claim 1, wherein said two transceiver antennas of said antenna pair have at least one of a same form and same dimensions.

6. The network according to claim 1, wherein said transceiver antennas of said antenna pair are aligned parallel.

7. The network according to claim 1, wherein said antenna pair is one of several antenna pairs disposed in said pipe system, communication in a case of said several antenna pairs, where transmitting and receiving areas of said antenna pairs are overlapping, at least one of different frequencies and protocols are provided for each of said antenna pairs for the data transmission.

8. The network according to claim 7, wherein said individual outlet is one of a plurality of individual outlets and said several antenna pairs are disposed in successive ones of said individual outlets.

9. The network according to claim 1, wherein said antenna pair is one of several antenna pairs disposed in said individual outlet, and at least one of different frequencies and protocols are provided for the data transmission for each of said antenna pairs.

10. The network according to claim 1, further comprising a cable conduit disposed in said main pipe, said electric data line is laid in said cable conduit in said main pipe.

11. The network according to claim 10, wherein said cable conduit is attached in a top area of a cross section of said main pipe, and said electric data line is led out from said cable conduit, in a vicinity of a confluence of said individual outlet into said main pipe.

12. The network according to claim 10, further comprising screws for attaching said cable conduit to said main pipe.

13. The network according to claim 1, wherein one of said second end developed as said transceiver antenna and said transceiver antenna disposed at said second end of said electric data line is disposed in an immediate area of one of said second end developed as said further transceiver antenna of said further data line and said further transceiver antenna disposed at said second end of said further data line.

14. The network according to claim 13, wherein said second end of said further data line faces said second end of said electric data line and protrudes from or leads out of an end of said individual outlet.

15. The network according to claim 1,
further comprising a further distribution unit;
further comprising further terminal devices disposed in a transmission area of said further distribution unit, said further terminal devices each having an apparatus for wireless the data transmission; and
wherein at a far end of said further data line from said main pipe, at least one of said terminal device and said distribution unit are connected.

16. The network according to claim 15, wherein:
said further distribution unit is a router for a WLAN for cable-free data transmission; and
said further terminal devices are computers.

17. The network according to claim 1, wherein at least one of said electrical data line and said further data line are developed as a coaxial cable with a single inner conductor.

18. The network according to claim 1, wherein said pipe system is a sewer line system.

19. The network according to claim 1, wherein said at least one junction pipe leads to a building.

20. A method for data transmission in a network formed of a pipe system having a main pipe and at least one junction pipe flowing into the main pipe and functioning as an individual outlet, which comprises the steps of:
installing at least one data line in the main pipe, the at least one data line having a first end connected to a data distribution unit and a second end developed as one of a transceiver antenna and equipped with the transceiver antenna;
installing at least one further data line in one of the pipe system and the main pipe via the individual outlet, the at least one further data line having a first end connected to a terminal device located outside the main pipe, and a second end developed as one of a further transceiver antenna and equipped with the further transceiver antenna; and
transmitting data by radio between an antenna pair formed by one of the transceiver antenna and the second end of the data line functioning as the transceiver antenna, and one of the further transceiver antenna and the second end of the further data line functioning as the further transceiver antenna.

21. The method according to claim 20, which further comprises aligning the transceiver antenna and the further transceiver antenna of the antenna pair, in one of an area of confluence of the individual outlet into the main piper and an area before the confluence of the individual outlet into the main pipe, to optimize the data transmission in relation to a reciprocal position.

22. The method according to claim 21, which further comprises aligning the transceiver antenna and the further transceiver antenna (11, 12) in parallel to each other.

23. The method according to claim 20, wherein:
the individual outlet is one of a plurality of individual outlets;
the antenna pair is one of a plurality of antenna pairs; and
communication between the transceiver antenna and the further transceiver antenna of the antenna pairs of the individual outlets takes place with at least one of different frequencies and protocols, the individual outlets are reciprocally within a respective transmitting and receiving area of the transceiver antenna and the further transceiver antenna.

24. The method according to claim 23, which further comprises assigning several of the antenna pairs to one of the individual outlets, and at least one of different frequencies and protocols are used for the communication in each of the antenna pairs assigned to the individual outlet.

25. The method according to claim 20, which further comprises putting the data line and the further data line into position in at least one of the main pipe, the individual outlet and in an area of the confluence of the individual outlet into the main pipe, by means of a remote-controlled robot.

26. The method according to claim 20, which further comprises one of leading and pulling the second end of the data line, acting as one of the transceiver antenna and having the transceiver antenna, out of a cable conduit carrying the data line, and the second end is positioned before the individual outlet.

27. The method according to claim 20, which further comprises disposing the transceiver antenna and the further transceiver antenna of the antenna pair toward each other in a position which produces at least one of a maximum data transmission rate and a minimum channel attenuation.

28. The method according to claim 20, which further comprises varying a length of the data line put in the pipe system, and of the further data line, starting from a fixed reference point preferably outside the pipe system, and one of a length and the laying position of the data line and the further data line is then fixed if a further insertion or pulling out of at least one of the data line and the further data line results in a deterioration of at least one of a data transmission rate and an increase in channel attenuation.

29. The method according to claim 20, which further comprises disposing the antenna pair in the main pipe downstream of a confluence of the individual outlet.

30. The method according to claim 20, which further comprises disposing the antenna pair in the main pipe downstream of a confluence of the individual outlet at a distance that is less than a diameter of the junction pipe.

31. The method for according to claim 20, wherein:
the pipe system is a sewer line system; and
the at least one junction pipe leads to a building.

* * * * *